Sept. 24, 1968     R. SPECK     3,402,580
LOCKING GAS CAP
Filed June 2, 1967     2 Sheets-Sheet 1
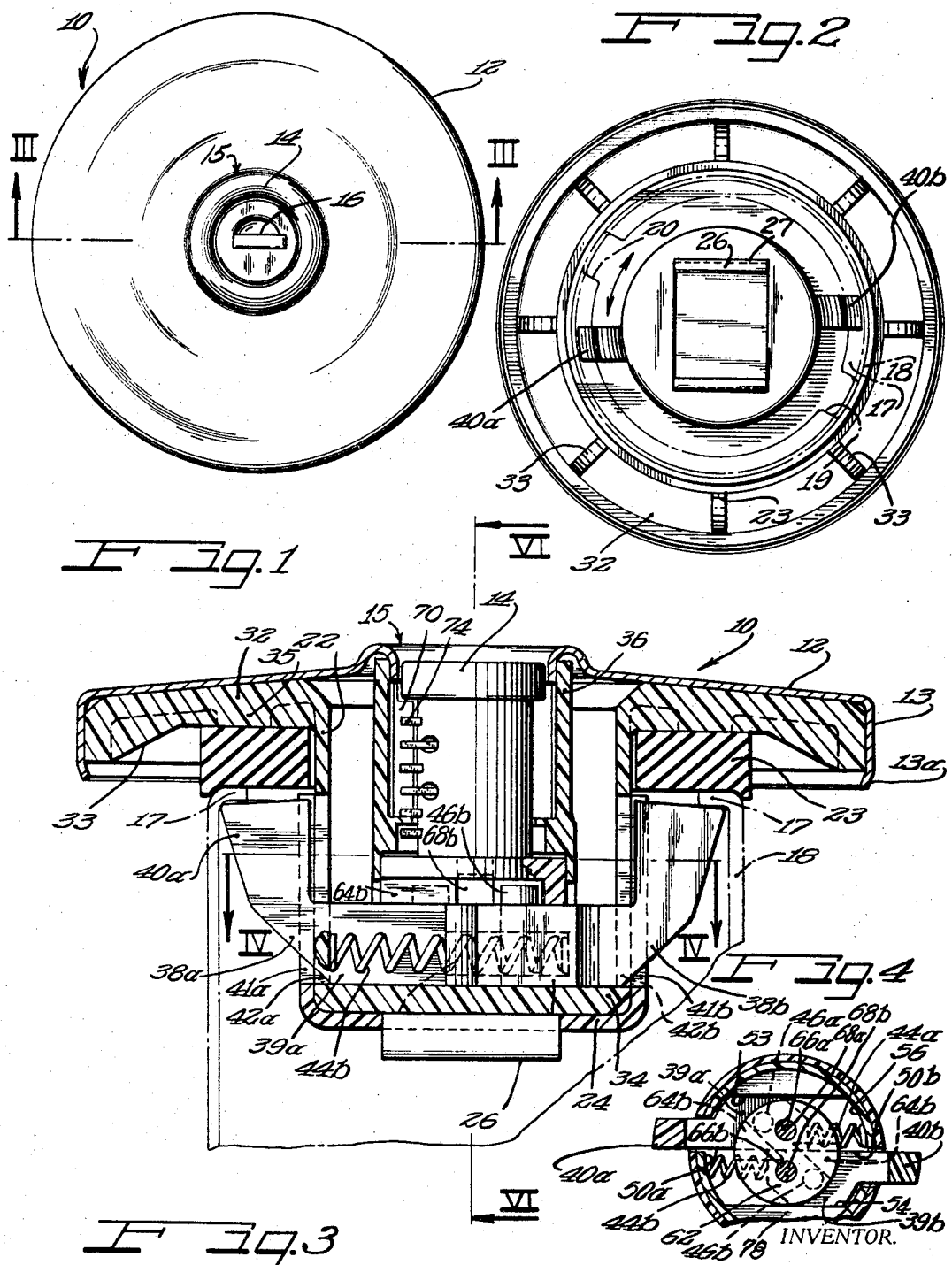
INVENTOR.
Raymond Speck

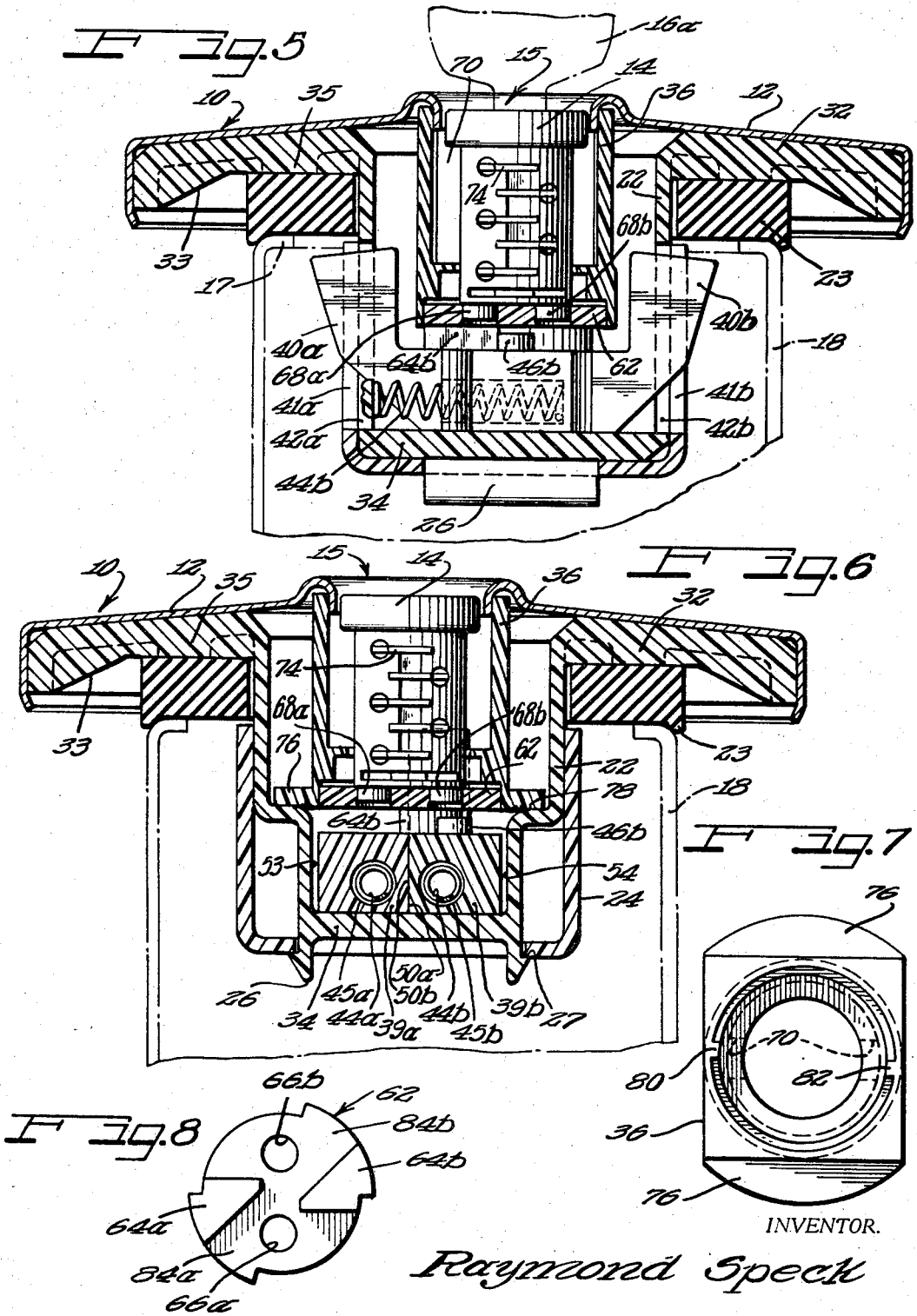

3,402,580
LOCKING GAS CAP
Raymond Speck, Riverside, Ill., assignor to Badger Manufacturing Corporation, Alsip, Ill., a corporation of Illinois
Filed June 2, 1967, Ser. No. 643,130
10 Claims. (Cl. 70—169)

ABSTRACT OF THE DISCLOSURE

A locking cap for a vehicle fuel tank having a cylindrical lock in a cup permanently connected to the cap, a camming member operatively connected to the cylindrical lock and a pair of spring loaded locking members, each having an ear projecting from the cup for adjustable engagement of different sized filler necks.

*Field of the invention*

This invention relates to a locking cap for a filler neck for a vehicle fuel tank which is adjustable to allow use with different sized filler necks.

*Prior art*

It is known to use a locking cap for receptacles such as fuel tank filler necks, including a cover and a central portion holding a cylindrical lock. Rotation of the lock relative to the cover causes retraction of a locking bar from a flange of the filler neck to allow removal of the cap from the filler neck. Such caps have been usable only in a single diameter filler neck.

*Summary*

In accordance with the present invention, I have provided a locking cap for a receptacle having an in-turned flange such as a fuel tank filler neck. The locking cap includes a shell with a cup permanently connected to the shell, a cylindrical lock in a central barrel of the cup and a pair of spring loaded locking members adapted to fit different sized filler necks. The in-turned flange is engaged by a pair of ears of the locking members which project from the cup.

Accordingly, it is an object of the present invention to provide a locking cap which is capable of adjustable fit in different sized fuel filler necks.

Another object of the present invention is to provide a locking cap of such configuration that it is adaptable for adjustable fit in a plurality of receptacles having an in-turned flange at the entrance thereof.

A further object of this invention is to provide a locking cap which is durable and made of a non-corrosive material.

Yet another object of this invention is to provide a locking cap having a pair of locking members which are spring loaded to prevent accidental displacement from a locked position in a receptacle.

Yet another object of this invention is to provide a locking cap having ears for engaging an in-turned flange of a receptacle, which ears are spring loaded to thereby assure a tight fit of the locking cap with the flange despite variations in size of the receptacle to which the locking cap is applied.

Many other advantages, features and additional objects of the present invention will become manifest to those versed in the art upon making reference to the detailed description and to the accompanying sheets of drawings in which a preferred structural embodiment incorporating the principles of the present invention is shown by way of illustrative example.

On the drawings:
FIG. 1 is a top plan view of a locking cap made in accordance with the present invention;
FIG. 2 is a plan view of the end of the cap opposite to the view of FIG. 1;
FIG. 3 is an axial sectional view through the locking cap showing the locking members engaged within the inturned flange of the filler neck taken along the line III—III of FIG. 1;
FIG. 4 is a fragmentary sectional view of the bottom of the cup taken along the line IV—IV of FIG. 3;
FIG. 5 is a view illustrating the operation of the invention similar to FIG. 3;
FIG. 6 is an axial sectional view taken along the line VI—VI of FIG. 3;
FIG. 7 is a bottom plan view of the fixed sleeve; and
FIG. 8 is a bottom plan view of the camming member.

As shown in the drawings:
The principles of this invention are particularly useful when embodied in a locking cap as illustrated in FIGS. 1 and 2, generally indicated by the numeral 10. The locking cap 10 is cylindrical and has a cover member or shell 12 which may be stamped, spun or otherwise fashioned. The margin of the shell 12 has a circumferential wall 13. The central portion of the shell 12 has an extruded aperture 15. In the aperture is secured a lock 14 operable by a key inserted in the key hole 16 on the exterior of the shell.

The locking cap 10 is adapted to fit within an inturned flange 17 of a receptacle or filler neck 18 of a fuel tank (not shown). The in-turned flange 17 has a pair of oppositely disposed slots 19 and 20.

The locking cap has a cup 22 which fits within the filler neck 18 and is surrounded by a gasket 23. The cup 22 extends into the filler neck 18 and is covered by a slidable cup-shaped sleeve or insert member 24. The size of the cup-shaped insert 24 is determined by the size of the neck 18. For minimum diameter necks no insert is necessary.

Projecting from a rectangular aperture in the base of the insert 24 is a prong-shaped rib 26 having a hooked end 27. The rib 26 cooperates with the aperture in the insert 24 to lock the cup 22 and insert 24 together. The cup 22 is formed integrally with a shell engaging portion 32 having radially projecting ribs 33 and a concentric rib 35 abutting the gasket 23. The cup 22 extends between the shell engaging portion 32 and a bottom wall 34 on which is the raised rib 26. Within the cup 22 is a fixed sleeve 36 forming a central barrel. The lock 14 is in axial rotatable relation to the fixed sleeve.

The cylindrical wall 13 of the shell 12 is in sliding fit relationship to the shell engaging portion 32. After the shell-engaging portion 32 is fitted within the cylindrical walls 13, the projecting portion 13a of the wall 13 is turned inwardly to mechanically lock the cover-engaging portion 32 with the shell 12. Directly above the bottom wall 34 and protruding from the cup 22 is a pair of locking members 38a and 38b. Since these members are identical, only member 38a will be described and similar reference numerals with the subscript b will be applied to member 38b.

The locking member 38a has an operating member 39a within the cup 22. The operating member 39a is connected to an ear 40a which protrudes from a slot 42a in the cup 22 and a corresponding slot 41a in the insert 24. The operating member 39a has a spring 44a disposed in a retaining groove (not shown) in a wall 56 of the cup 22 and a cylindrical recess 45a within the operating member 39a.

The locking members 38a and 38b are identical and are assembled in the bottom of the cup 22 with their interior walls 50a and 50b abutting. The operating member 39a is of generally trapezoidal cross-sectional area to allow for sliding fit within parallel interior walls 53 and 54 at the bottom of the cup 22 above the bottom wall 34. The parallel interior walls 53 and 54 are connected by cylindrical connecting walls 56 of the cup 22.

The operating member 39b has a molded pin 46b on its top surface which is engaged by a camming member 62 having a pair of triangular camming surface 64a and 64b for bossing the pins 46a and 46b. The camming member 62 has a pair of holes 66a and 66b to engage a pair of operating pins 68a and 68b of the cylindrical lock 14.

The fixed sleeve 36 has a slot 70 extending in an axial direction within which in the locked position of the lock 14, are disposed a plurality of lock pins or abutments 74. The fixed sleeve 36 has oppositely disposed projecting portions 76, FIG. 7, which bear on a shelf 78 formed in the cup 22.

The camming member 62 is in a rotating relationship with the bottom of fixed sleeve 36. Rotation of the camming member is limited by a pair of lugs 80, 82 disposed on the interior of the base of the fixed sleeve. The lugs 80, 82 form stops for the camming member 62 by engaging and limiting the range of rotation of a pair of increased diameter sectors 84a and 84b thereon, FIG. 8.

Since the locking members 38a and 38b are spring loaded, the locking cap 10 will fit a plurality of receptacles having in-turned flanges which may be engaged by the ears 40a and 40b. The size of the receptacle capped is limited by the diameter of the insert 24 and the distance to which the ears 40a and 40b may extend. As presently sized, the locking cap 10 of the invention will fit 98% or more of fuel filler necks in United States automobiles. The cup diameter is 1.375 inches and 1.500 inches with an insert thereon. The ears extend over .343 inches from the cup.

To remove the locking cap 10 from the receptacle 18, a key 16a is inserted in the keyhole 16 of the lock 14 to disengage the lock abutments 74 from the slot 70. The lock 14 is rotated and the pins 68a, b rotate the camming member 62 through the pin holes 66a, b. The triangular surfaces 64a, b boss the pins 46a, b of the locking members 38a, b. This causes the ears 40a, b to retract into the cup 22, thereby allowing the locking cap to be removed from the filler neck 18, FIG. 5.

To re-engage the locking cap 10 in the receptacle 18, the reverse procedure of that set forth above with respect to retracting the ears 40a, b may be used. Alternatively, the locking cap 10 may be directly inserted in the filler neck 18. Since the ears 40a, b are spring loaded, abutting the ears 40a, b against the in-turned flange 17 of the filler neck 18 will cause the ears 40a, b to recess the amount required within the cup 22. The operating members 39a, b of the locking members 38a, b slide with respect to each other into the interior of the cup as the ears 40a, b recess into the cup 22. The springs 44a, b are tensioned until the flange 17 is removed from contact with the ears 40a, b then they will push the operating members into an extended position, thereby causing the ears 40a, b to engage the in-turned flange 17 and thereby lock the cap 10 to the filler neck 18. The camming member 62 does not rotate. The operating pins 46a, b slide away from the triangular bosses 64a, b. A sound fit is assured by the gasket 23 overlying the flange 17 of the filler neck 18 and the concentric rib 35 of the shell engaging portion 32.

The insert 24 and the cup 22 formed integral with the shell-engaging cover 32 are preferably formed of a polymer resin or other synthetic plastic that is self-lubricating and has a high degree of flexibility and considerable elasticity, together with high tensile strength and resistance to flow under moderate loading pressures, inertness to oils and greases or other lubricants, and capable of being molded. Among such plastics are nylon which is a linear polymeric amide; Celcon which is a copolymer or trioxane; Delrin which is an acetal resin or a polymerized formaldehyde resin; Marlex which is a polyethylene; and polyurethanes.

An important side of the invention has to do with the operation of the spring loaded locking members which has the ears 40a, b projecting a sufficient distance to allow for adjustable fit in a plurality of sized receptacles having an in-turned flange only requiring the projecting ears 40a, b be sufficiently spaced from the center of the cup to allow for engagement with the in-turned flange of the receptacle.

Although minor modifications might be suggested by those versed in the art, it should be understood that I wish to embody within the scope of the patent warranted hereon all such embodiments as reasonably and properly come within the scope of my contribution to the art.

I claim as my invention:

1. A universal locking cap for a receptacle including a
   (a) shell;
   (b) a cup permanently connected to said shell, said cup having a central barrel;
   (c) a cylindrical lock in the barrel having a pair of axially projecting pins;
   (d) a camming member operatively connected to said cylindrical lock having a pair of apertures to receive said lock pins;
   (e) a pair of spaced, axially extending triangular bosses disposed on the side of the camming member opposite said pins;
   (f) a pair of spring-loaded locking members each having an ear projecting from said cup;
   (g) each locking member having an operating member slidable transverse to the axis of said cup and on said operating member an axially projecting pin in engagement with a side of one of said triangular bosses; whereby rotative movement of said cylindrical lock rotates the triangular bosses of said camming member to allow movement within said cup of said operating members to cause said ears of said locking members to withdraw into said cup and allow removal of said locking cap from the receptacle.

2. A locking cap as recited in claim 1 wherein said operating member has a cylindrical recess adopted to receive a coil spring to bias the ear in an extended locking position.

3. A locking cap as recited in claim 1 wherein said locking members are in slidable relation with respect to each other within parallel walls of said cup.

4. A locking cap as recited in claim 1 wherein the barrel has a fixed sleeve with a slot running in the axial direction of said cup which forms an abutment for the operating pins of said lock.

5. A locking cap as recited in claim 4 wherein said sleeve has a pair of cut out slots on opposite sides thereof adapted to receive said ears in the recessed position.

6. A locking cap as recited in claim 1 wherein said cup member and ears are composed of a plastic material that has the physical properties of one of the group of a copolymer of trioxane, a polymerized formaldehyde resin, a polyethylene and a polyurethane.

7. A locking cap as recited in claim 1 wherein the diameter of said cup is sufficiently small to allow fit in small-sized receptacles and said ears in an extended position are sufficiently displaced from said cup to allow a locking fit with large size containers having an in-turned flange.

8. A locking cap as recited in claim 1 wherein the cap is adjustable by means of said spring-loaded ears for locking engagement with a plurality of sizes of filler necks.

9. A locking cap as recited in claim 1 wherein an insert member is provided having a larger cross-sectional area than the cup, and means for mounting the insert member thereon for different sized filler necks.

10. A locking cap as defined in claim 9 wherein said means comprises a prong-shaped rib extended axially of a bottom side of the cup and with said prong-shaped rib being cooperable with an edge defining an aperture in an insert member.

References Cited
UNITED STATES PATENTS

| | | | |
|---|---|---|---|
| 2,065,293 | 12/1936 | Scudder | 220—6 |
| 2,796,192 | 6/1957 | Nehls | 70—169 |
| 2,880,903 | 4/1959 | Nehls | 70—16 |
| 3,136,148 | 6/1964 | Nehls | 70—16 |
| 3,289,442 | 12/1966 | Berger | 70—17 |

MARVIN A. CHAMPION, *Primary Examiner.*

E. J. McCARTHY, *Assistant Examiner.*